J. GOOD, DEC'D.
J. E. GOOD, ADMINISTRATRIX.
COMBING MACHINE.
APPLICATION FILED NOV. 26, 1909.

1,077,526.

Patented Nov. 4, 1913.
5 SHEETS—SHEET 1.

Attest:
M. Gaertner
H.G. Kimball

Julia E. Good admi'x ) Inventor:
of John Good dec'd
by
M. Moore Freeman Attys.

COLUMBIA PLANOGRAPH CO., WASHINGTON, D. C.

J. GOOD, DEC'D.
J. E. GOOD, ADMINISTRATRIX.
COMBING MACHINE.
APPLICATION FILED NOV. 26, 1909.

1,077,526.

Patented Nov. 4, 1913.
5 SHEETS—SHEET 4.

UNITED STATES PATENT OFFICE.

JOHN GOOD, DECEASED, LATE OF FAR ROCKAWAY, NEW YORK, BY JULIA E. GOOD, ADMINISTRATRIX, ASSIGNOR TO GOOD INVENTIONS CO., A CORPORATION OF NEW YORK.

COMBING-MACHINE.

1,077,526.

Specification of Letters Patent.     Patented Nov. 4, 1913.

Application filed November 26, 1909. Serial No. 529,949.

*To all whom it may concern:*

Be it known that JOHN GOOD, deceased, late a resident of Far Rockaway, Long Island, State of New York, invented certain new and useful Improvements in Combing-Machines, of which the following is a full, true, concise, and exact specification.

The invention is an improvement in apparatus for preparing hemp and like fiber for spinning, and is termed herein a combing machine for the reason that its operation is essentially that of separating, disentangling and parallelizing the fiber, although the embodiment of the invention forms a substitute for machines for performing the several various functions specifically known as scutching, hackling, breaking, spreading, drawing, etc.

It is the object of the invention to simplify the apparatus and reduce the time, labor and number of operations required for the preparation of the fiber, from the bale to the spinning machine, so as to reduce the cost of manufacture thereof, and also to improve the quality of the sliver or product derived therefrom.

It is a special object of the invention to produce an apparatus adapted to receive and operate on the fiber in the first instance, in its crude or raw state, that is to say, as taken from the bale, and capable of reducing such fiber by a single operation to the condition of uniformly attenuated and thoroughly combed sliver, ready to be spun, or to be further drawn and thereafter spun, as the case may be: but it is not a limitation on the invention that apparatus embodying the same may require a second, or even a third operation on certain fibers to produce a sliver or yarn therefrom of desired quality.

It is a further object of the invention to provide means for opening, straightening and disentangling fiber efficiently and without straining or injuring it and especially to open up and disassemble the so-called squared-ends of the fiber, and separate and distribute the individual fibers thereof longitudinally so that the presence or reproduction of such squared ends in the product sliver is thereby avoided.

It is a still further object to construct a machine of the kind described adapted for operation with the least amount of power.

These and other objects, which if not particularly explained herein will be apparent to those skilled in this subject, are attained by apparatus embodying or adapted to carry out the principles of the invention, hereinafter fully set forth.

The particular apparatus taken to illustrate the invention and the principle of the construction and operation thereof, is a machine adapted for operation on hemp of the several commercial varieties commonly used for the manufacture of rope. The invention, however, is not limited to the treatment of such fiber but may be used in the preparation of other fiber, as for example fiber of a similar nature for which gill-boxes or other forms of hackling machines are now generally employed, and the changes or adjustments necessary for adapting the apparatus to such other uses, will be apparent, to those familiar with the art, from the following explanation.

The drawings forming a part hereof, illustrate the relationship and general construction of the several parts of a hemp-combing machine, without, however, indicating the various details of the mechanical construction, which are omitted as being matters of ordinary mechanical construction quite familiar to makers of this kind of machinery.

In the said drawings.

The term lap appearing herein is used to refer generically to a continuous ribbon of superposed and overlapping fibers, or bunches of fibers, whether combed or not, and the term sliver as used herein, designates such a lap during or subsequent to its subjection to the combing action, a sliver being a lap of somewhat attenuated and partially or wholly combed, but still untwisted condition.

The machine taken for illustration of the principle on which the invention operates, is a duplex apparatus, consisting of two similar machines built into the same frame, and a description of one of them will therefore suffice for both. The lap feeding means of each individual machine shown is divided into four feed-heads compactly arranged, above a combing means which is common to each head and will be later described. The feed heads may be of identical construction and operation, and are so shown.

Figure 3:
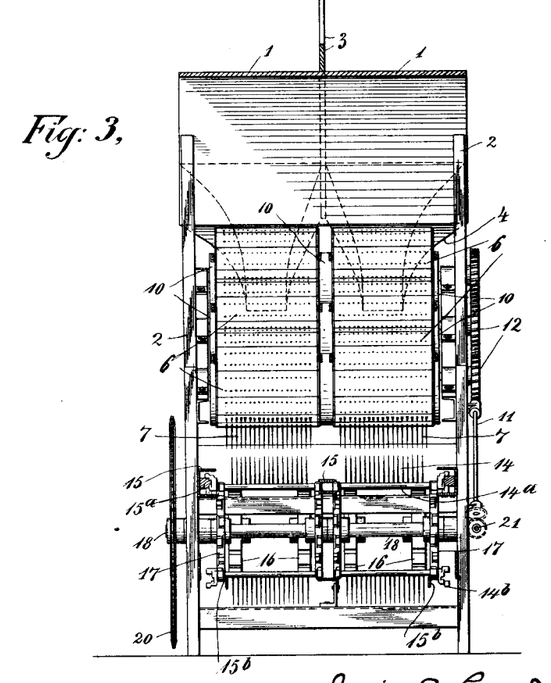
Fig. 3 is a cross-section on line III—III of the machine of Fig. 1 on the same scale and looking in the direction of the section-line arrows.

Each feed-head is provided with a hemp or fiber-receiving feed-board, marked 1, upon which the bunches of the raw fiber are intended to be placed by hand in successively overlapping and superposed relation, so that, as they are taken up and conveyed to the combing means, by the moving parts of the feed-head, they form a continuous fiber lap. The feed-board 1 is preferably downwardly inclined toward the rear or feeding end of the machine, and is supported in this position by any suitable means, such as the upright posts 2, which rise from the machine frame. In the duplex machine shown, the fiber-receiving board is formed by a flat wooden table divided by an upright partition, marked 3, into two separate feed-boards, one for each individual machine, as shown in Fig. 3. At the lower end of each feed-board there is placed an elbow chute or conduit 4 formed with converging or funnel-shaped walls, and at the exit end of the elbow there is a feed apron 5, which is reversely inclined with respect to the feed-board, so that it slants downwardly and forwardly in the general direction of the operating movement of the combing pins. The lap of fibers which is formed on the feed-board is conducted by the curved elbow 4, being at the same time somewhat compacted and condensed thereby, to the top of the feed-apron 5, where it is engaged by a train of moving gill-pins and fed or drawn downwardly by them to the place where the combing takes place. This feeding means, or feeding train, may be variously organized for the purpose, and in the present case is composed of a set of three revolving feeding cylinders 6, although a less or greater number may be employed, depending on the length of the fiber to be combed. Each cylinder is supplied with self-housing gill-pins 7 arranged to be projected from the wall or casing of the cylinder on the lower side thereof and to be withdrawn or housed within said casing at the top and sides. The construction of cylinders of this kind is well known to the art and will not require detailed description, further than to say that the gill-pins are carried on gill-bars 8 which are mounted to slide in radial slots or slideways 9 (Fig. 6) in the end walls of the cylinder casing, and with their ends projecting beyond the end-walls to be engaged by appropriate interior slots in the adjacent, stationary cam-plates 10 (see also Fig. 3). The cam-plates 10, being usually adjustable, are set so that the gill-bars will be moved outwardly and project their pins outwardly as they approach and pass over the feed-apron 5, as above stated. The three cylinders are closely juxtaposed and provide an inverted feeding train to which the appropriate motion is imparted by revolving them in the same direction, by means of the inclined worm-shaft 11, which has ordinary worm and gear connections 12 with each cylinder. The several cylinders may be revolved at the same rate, but it is sometimes preferred to drive the lowermost cylinder slightly slower than those preceding it in the train, which can be effected by correspondingly changing the worm gear of that cylinder. In order to maintain the lap in substantially uniform engagement with the feeding train during its passage down or along the feed-apron, it is supplied at intervals with hummocks 5ª, which give it an upper surface that is curved in conformity with the general contour of the set of cylinders and thus provides a passageway for the sliver of substantially uniform depth. The fiber lap in passing from the feed-board becomes inverted by the change of direction given to it by the curved elbow-chute, and is supplied to the feeding-train in an inverted position, so that the forward ends of the bunches of fiber, as placed on the feed-board, become disposed on the underside of the main body of the lap as the latter is moved downwardly along the feed-apron. The inverted positions of the ends of several fiber bunches are indicated in the feed-heads shown in Fig. 5.

Figure 5:
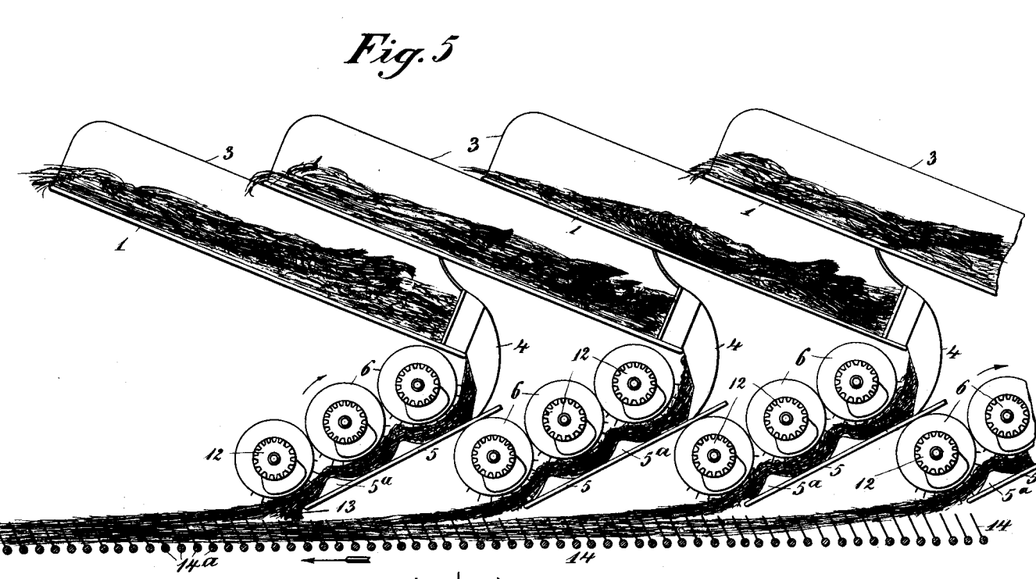
Fig. 5 is a diagrammatic elevation of the feeding trains and combing means still further enlarged.
Figure 6:
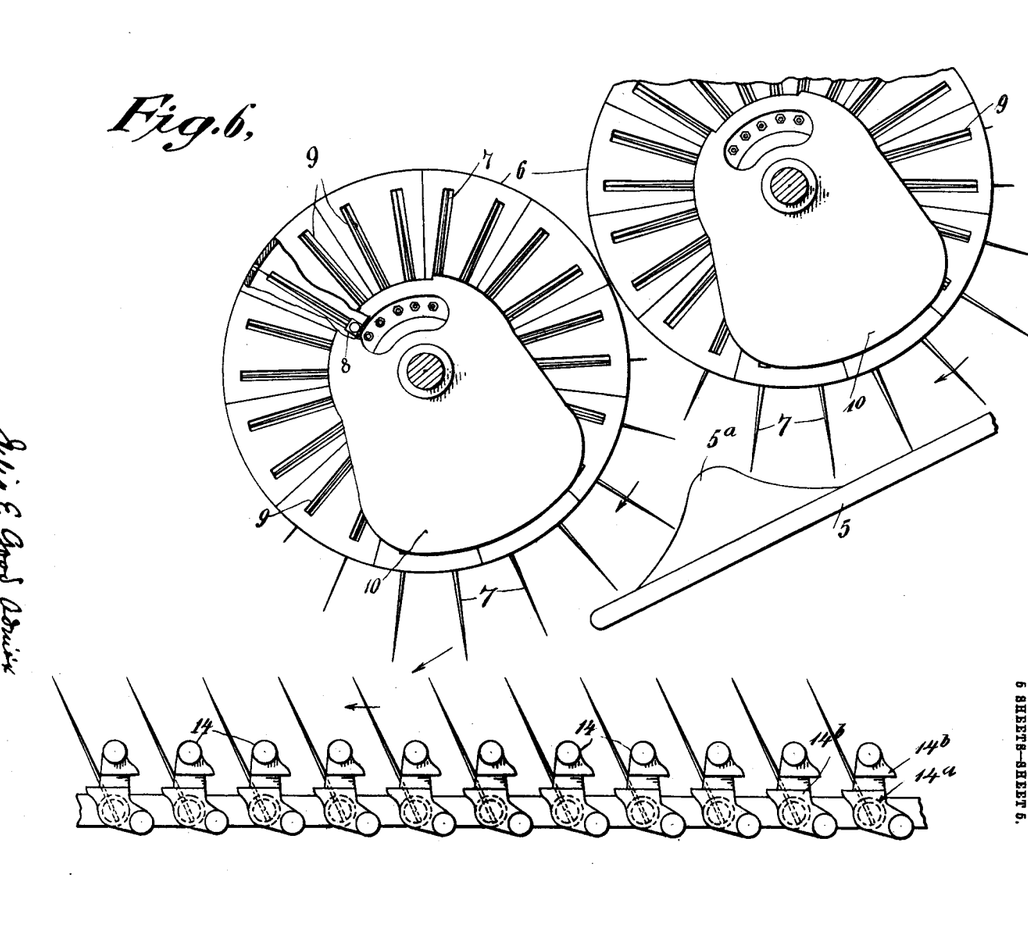
Fig. 6 is a further enlarged detail of the feeding and combing trains, indicating their relation at the place of introduction of the fiber lap to the combing train.
Figure 7:
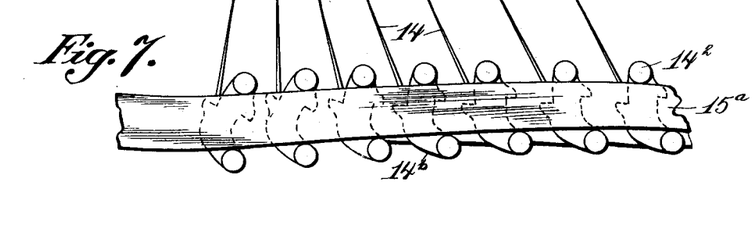
Fig. 7 is a detail view illustrating the means for changing the rake of the pins of the combing train by variation in the relative positions of the degs and their trackways.

The squared, butt ends of the fiber, representing the cut ends or bases of the hemp stalks or leaves as harvested, are compactly matted together and frequently partially cemented by the dried sap of the plant, and are the most difficult part of the fiber to separate and prepare for spinning. It is a custom in feeding hemp-machines, prescribed largely by convenience of handling, to feed the squared ends of the fiber first, and such method of feeding is desirable and preferred in the practice of this invention, since the squared ends, by the inversion of the lap, are allowed to hang or project toward the combing pins as soon as they have passed off of the lower end of the feed apron 5. This position is indicated at 13 in the figure referred to. The squared end, it will be seen, is held down by the body of lap immediately above it, and, being otherwise unsupported, is free to dangle in a position where it can be encountered and battered by the points of the rapidly moving combing pins, before it is fully presented to them and before it receives the full combing action thereof, which takes place in a novel manner later described. The battering effect of the rapidly moving pin-points upon the freely hanging and laterally unsupported end sets it in vibration, knocking or shaking out the dirt, and loosens and frays out the snarled and matted parts thereof, without, however, taking hold and tearing the fibers or straining the pins.

After a sufficient battering, the loosened and partially straightened end will maintain continuous engagement with the combing train, due to the advancing movement of the feed, and will gradually merge into the main body of its lap. The duration of the battering action, it will be observed, is determined by the height of the lower end of the feed apron 5 above the combing train as well as by the rate of the feed, and may be controlled accordingly. This preliminary intermittent or partial engagement of the squared end with the combing pin train, constitutes a preparatory treatment that greatly facilitates the subsequent operations and constitutes an important feature of the present invention which is independent of the specific means for feeding the fiber or the number of such feeds or the specific means employed for effecting the combing and the same is herein broadly claimed as an independent improvement in the art.

The several feed-heads are disposed above the fiber-receiving end of the combing pin train and in tandem relation with respect to the direction of movement thereof, all the parts of each feed head being suitably carried on the frame, as by the upright frame posts 2. The construction of the feed-heads permits them to be arranged close together, and preferably with their feed-boards overlapping so that an attendant standing by the side of the machine on a suitable platform (not shown) can readily place the bunches of fiber upon each feed board as rapidly as may be required.

The combing means for each side of the duplex machine preferably comprises a combing chain construction of common and general use in fiber-working machinery, and as shown, for example, in Patent No. 108,473, issued to the inventor hereof October 18, 1870, but any suitable means adapted for causing a succession or train of combing pins to move in a prescribed operative path will likewise meet the purposes of the invention. The chain marked 14 in the drawings, is constituted of an endless articulated series of connected gill-bars 14ᵃ. Each bar carries a row of combing pins and is pivotally carried in the links which form the articulation, and is also provided with a dog 14ᵇ at its end which controls the angular position of the gill-bar with reference to the track upon which the series or chain of gill-bars is caused to move. The said tracks are formed in upper and lower stretches on the opposite inner faces of longitudinal side and center girders 15 of the duplex machine, the upper stretches being marked 15ᵃ in Figs. 1 and 3, and the lower stretches 15ᵇ. The train or chain of gill-bars is adapted to travel on the upper stretch 15ᵃ in the direction of the arrow and toward the delivery end of the machine, at which point the upper track leads downwardly into the lower track 15ᵇ. The lower track may or may not be continuous, as desired, since the combing pins in passing over it are required to do no work. The chain passes to the opposite end of the machine, where the notched idler wheels 16 (Figs. 1 and 3) are provided for returning it upwardly, through appropriate guiding channels, to the level of the upper track, so that the said chain may thus revolve continuously in the same circuit or path. The upper tracks support and guide the upper stretch of the combing chain in a path directly beneath each of the several lap-feeding means and beneath the lower ends of the feed-aprons thereof, and as the combing-pins pass the feed heads they are held in an upright and slightly forwardly inclined position, but as they approach the delivery end, their forward angle is diminished and gradually reversed, and finally they are turned back in their supporting links, so as to maintain an upright position as they leave the sliver and pass downwardly into the lower return track. The angular position or rake of the combing pins is controlled by the gill-bar dogs 14ᵇ which travel upon ribs or grooves appropriately shaped for the purpose. The ribs appear in section in Fig. 3, but their pin controlling arrangement is not shown in detail because such arrangement is common in all self-righting combing-pin chains and well known to the builders thereof. The combing chain as thus constructed and mounted, however, differs from prior combing chains in that it is driven from its middle portion by means of a pair of sprocket gears 17 (Figs. 1 and 3) on a shaft 18, and these sprockets engage the upper and lower stretches of the chain 14 at points intermediate of the ends thereof. Such location of the chain-driving sprockets constitutes a further independent feature of the present invention inasmuch as the chain is thereby simultaneously pushed and pulled along both of its stretches, and the strain on the links is thereby reduced, which in turn reduces the power required for driving them.

The several fiber laps continuously supplied by the plurality of tandem arranged feed heads in the manner above described, are operated upon simultaneously by the combing pin train or chain and the individuals fibers constituting such laps are gradually combed and drawn out thereby, being successively deposited in superposition upon said combing train as fast as they are released or become disentangled from the pins of their respective feeding trains, so that a simple composite lap or sliver, made up of successively overlapping fibers taken from each of the laps, is thus formed or laid on the combing train, which conducts it as fast as formed to the delivery head, by which it is discharged from the machine. The disengagement of each individual fiber takes place as soon as the friction of the moving combing pins, engaging its forward portion, surpasses the holding effect of the feeding pins and of the lap body, engaging its rear or tail portion, and the withdrawal of the tail portion out of its tangled relations in the feed-head straightens or combs that end, so that the whole fiber is substantially free and straight when received upon the combing train. It will be observed that a feeding means comprised of a train or series of gill-pins to engage and feed the lap, constitutes a particularly efficacious instrument for holding the main body of the lap while it is still uncombed, but yet allowing individual fibers to be drawn out therefrom when the pull of the combing pin train is sufficient for that purpose; and it will be further observed that by feeding the fiber lap with such an instrument, preference is given to the disengagement of individual fibers rather than bunches of fibers. The bunches, as such, will remain held or caught in the feeding-pin train while their component fibers are taken away one by one. This successive letting go of separate fibers tends to promote an average condition of the sliver on the combing pin train, but is more especially of advantage in that it results in a thorough dissipation of the squared end arrangement of the fibers. Although the butt or squared end of a bunch of fiber may have already been thoroughly opened and straightened by the previous battering and the combing action, the fibers thereof may still be left terminating at the same or about the same point, and it is a matter of obvious desirability that such co-extensive arrangement and termination of fibers, i. e. squared ends, shall not be transmitted to the product sliver, even though the fibers themselves may be already thoroughly combed or disentangled from each other. The presence of such squared ends in the sliver interferes with its spinning and disturbs the uniformity of the yarn, thereby impairing its value and utility.

The combing action that is performed by the combing pin train on the end of the fiber-lap extending forwardly from the feed-head, is conducted in a manner which is specially efficacious in producing the successive disengagement of fibers just referred to, and also highly efficient in other respects, as will presently appear. The method and means of accomplishing such action are independent of the number and mode of operation of the feed-heads and the construction of the combing means, and constitute a further separate feature of the present invention, made the subject of independent claims herein. The fiber-lap, it will be observed, is introduced to the middle or intermediate part of the flat combing table formed by the operative stretch of the combing chain and not to the end of such chain as heretofore. Thereby the lap enters into engagement with the chain at an angle to the path of movement of the pin-points and the pins therefore do not deeply penetrate the fiber in the first instance, but the latter is caused to trail or float on the points or tips of the pins without settling into or between them until fully combed, or nearly so. This floating position is intended to be indicated in Fig. 5, and is characteristic of feeding to an intermediate part of a combing table or chain. The initial and most difficult part of the combing operation, involving the disentanglement of snarls and loops, is performed by the action of the points of the pins, in a gradual and non-positive manner that does not strain either the fiber or the pins. The pin-point engagement is in the nature of a frictional engagement, as compared with the positive, non-slipping engagement of pins directly and deeply penetrated into the fiber, and hence serves in a most effective manner, to draw out only those fibers which are ready to let go as the friction increases and the lap is advanced, and such withdrawal takes place gently and without developing additional snarls in the part of the lap still held by the feeding train. In order to promote the floating position of the fiber, fed in this way, the rake of the combing-pins is adjusted in conformity with their path of movement in the train so as to keep the fiber from drawing down upon their bases while under strain, but with sufficient forward inclination to insure that the fiber does not ride ineffectively over the pin points without being combed; that is to say, the rake of the pins is to be reckoned with respect to the direction or angle of the pull on the fiber and to be coördinated therewith, so as to prevent a too positive, initial engagement with snarls and knots. As the advancing fibers become relatively disentangled, the direction of the pull grows more nearly parallel with the combing train and the fiber gradually sinks down into more positive engagement with the pins.

The rake of the pins is preferably maintained at a constant angle with reference to the flat plane of the combing table, throughout their full range of combing action; but in the case of a combing table of different contour, the rake of the pins may be controlled accordingly for producing the floating effect. The rake of the pins should preferably also be coördinated with the combing draft, that is to say with their velocity of movement relative to that of the feeding train. It is found that with other conditions the same, a higher draft tends to raise the fiber being combed, while a lower draft tends to allow it to sink slightly, although a considerable difference either way is necessary to cause an appreciable change of position. The combing draft suitable for any given case, however, is determined by the amount and character of the fiber supplied by the feeding means and certain other conditions, as will be presently explained, and it will therefore be more convenient to ascertain in the first instance, at least within general limits, the appropriate draft for the case in hand and thereafter set the rake of the pins accordingly; that is to say, so that the fiber will be combed by floating on the pins and before being drawn down upon their bases, as above explained.

Figure 1:
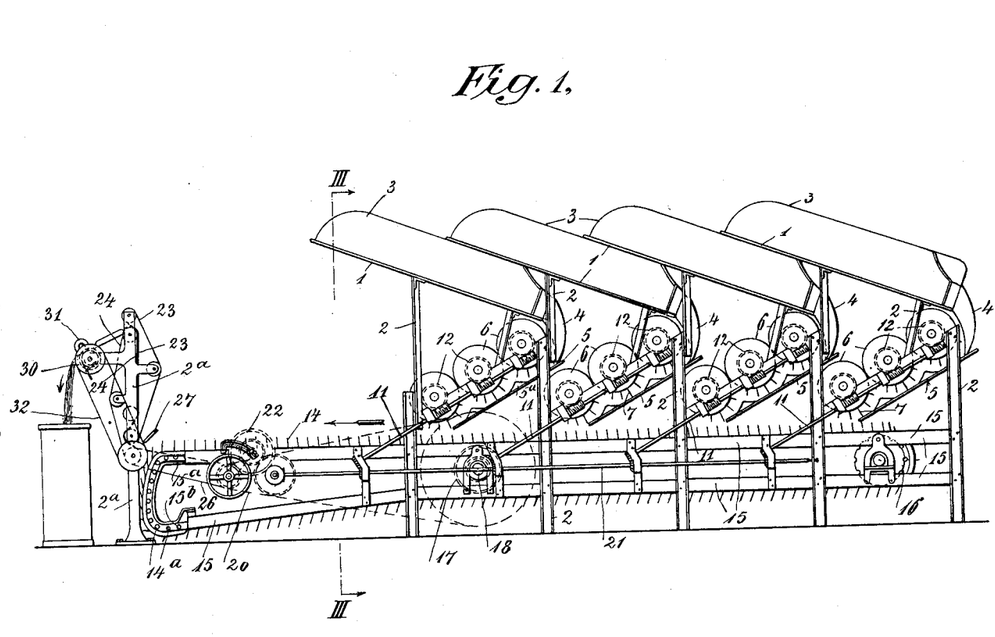
Figure 1 is a side elevation of a machine such as referred to, suitable for combing Manila hemp and embodying this invention.
Figure 2:
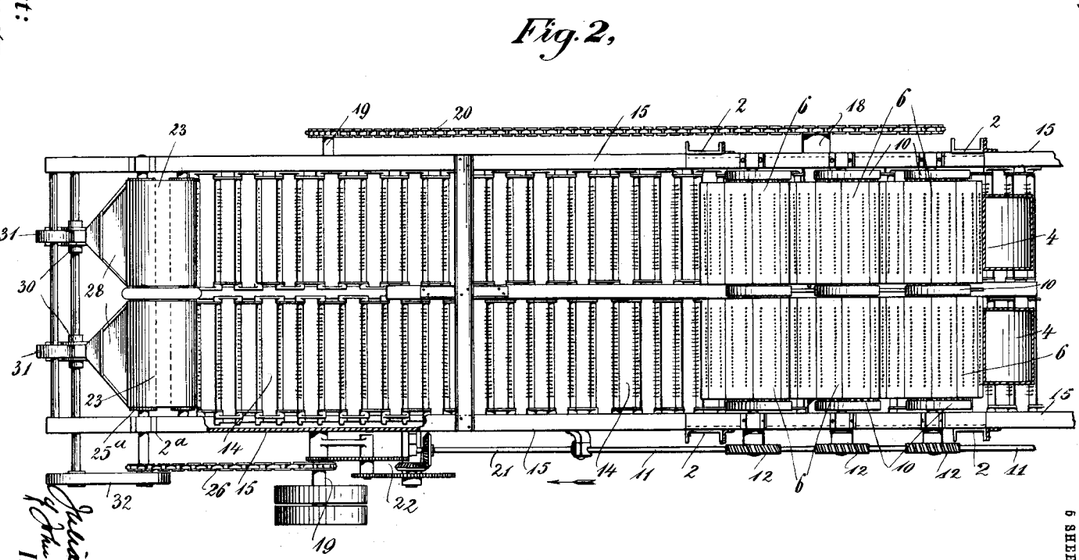
Fig. 2 is a top plan of a portion thereof on a larger scale.
Figure 4:
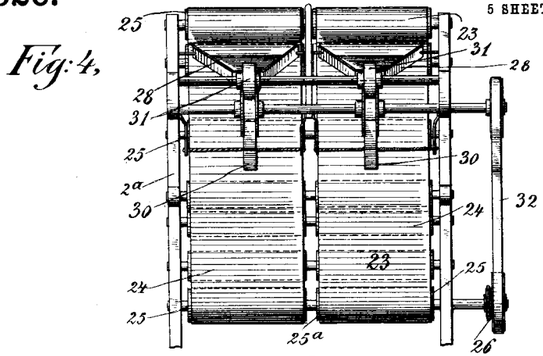
Fig. 4 is an end elevation of the delivery end of the machine.

The shaft 18 which drives the combing chain is driven by the main power-shaft 19 through sprocket chain gearing 20, and on the opposite side of the machine, each of the several feed-head-driving worm-shafts 11 is bevel-geared to a longitudinal feed drive-shaft 21 that is common to all of the heads, being appropriately journaled in hangers or brackets on the girders 15. The said shaft 21 is driven by a change-gear system 22 of obvious arrangement, which is itself driven from the power shaft and constitutes the means which determine the relation of the rates of movement of the combing and feeding instruments, i. e. the combing draft. The delivery head by which the composite combed sliver is discharged from the combing train is located at the delivery end thereof and is constructed on a principle which is familiar in hemp-drawing frames and shown in end view in Fig. 4. There is one such head on each side of the duplex machine, and each delivers the composite sliver from its corresponding chain. The head is composed essentially of two belts 23 and 24 supported on rollers 25 and provided with suitable take-ups, all of which are carried in the side frames 2ª as shown in Fig. 1. One of the rollers of the set, and marked 25ª, is driven by a sprocket chain 26 from the power shaft 19, as shown in Figs. 1, 2 and 4, and the speed ratio of this driving connection is subject to adjustment by changing the sprocket gears in the obvious manner. The two delivery belts run in mutual contact for a considerable length of movement, indicated by the heavy line of Fig. 1, and the fibers constituting the combed sliver are projected toward and into the nip of the two contacting belts at about the level of the combing chain, being assisted thereto by the guide-board 27 (Fig. 1) or any additional guiding means for this purpose that may be necessary, while the combing pins withdraw from the sliver and pass downwardly beneath the guide-board, following the curvature of their tracks. The belts carry the sliver between them and upwardly to a point which is elevated somewhat above the level of the combing chain, where they deliver it, over a short funnel-shaped conductor 28, to a pair of condensing rollers 30 and 31, of usual construction, by which it is discharged from the machine. The condensing rollers are driven by belts 32 from the shaft of the roller 25ª, as shown.

The combing machine taken for illustration and above described, is proportioned and designed for operation on manila hemp and is capable of producing a continuous, uniform sliver ready to spin, from the raw fiber fed directly from the bale to its several feed-heads. There are four such feed-heads, tandem arranged, and separated from each other by a space sufficient to avoid interference by the fibers held and floating from a feed-head in the rear, with the floating of fibers by the feed head next in front, each successive lap being preferably fed at a point on the chain where the fibers of the lap or laps in the rear have settled into the chain sufficiently to expose the points of the pins, and to allow the latter to batter and open the matted ends. The combing draft of this machine, as determined by the change gear system above referred to, is about 100; which is to say that the combing chain travels 100 units, linear distance, to one unit of lap-feeding movement of each feed-head; but this draft may be varied, if desired, the controlling consideration being that while the draft must be sufficiently high to subject each fiber to the action of the combing-pins for a long enough period (or to a sufficient number of pins) to be thoroughly straightened and disentangled from its neighbors, which is a matter of ready determination, yet it must not be so high that a sufficient number of such fibers will not be continuously drawn out of the feed-heads to constitute a composite sliver of sufficient body to be capable of being properly and continuously carried and delivered from the chain, that is to say without danger of its lapping around the lower stretch thereof. The total amount of fiber fed to the combing train, that is to say, the thickness or size of the several laps in the machine, is likewise a controlling factor of the range of suitable combing drafts. The larger the amount of fiber that is fed per unit of feeding movement, the higher the draft may be, to result in the same body of sliver, from which it will be seen that the greatest efficiency from the present invention may be had by coincidently increasing and coördinating both the amount of feed and the combing draft to the fullest extent consistent with the capacity of the mechanical construction. For the best results, however, such relative adjustment of conditions should be made, also, with regard to the nature of the particular fiber under treatment, since certain kinds of fiber are more difficult to comb than others, and require more or longer operation by the combing-pins; fibers that are relatively short usually require relatively longer treatment, because short fibers more readily let go of the feeding trains; and thus, in general, the combing draft will be higher for fibers that are short or difficult to comb, and the amount of the feed will be coördinated therewith so as to produce a sliver of proper and desired weight. The feed of the fiber in any case, however, is distributed over a considerable portion of the combing train, as by dividing it up into a number of separate laps, each advanced by its own feeding means, as shown and above described and preferred, so that thus the combing-pins, and also the feeding-pins, will not be locally overloaded or impeded in the performance of their respective functions, and further, so that the composite sliver formed on the combing train will represent the average of many separately attended feeds and will hence acquire uniformity of thickness or body due to the operation of the law of averages, as will be readily understood. The increase of the amount of feed should thus preferably be effected by increasing the number of separate laps or feed-heads.

The length of combing chain between the delivery head and the nearest feed head is somewhat longer than the length of the fiber composing the lap or sliver, so that both ends of every combed fiber are momentarily free while being carried on the chain to the bite of the delivery belts. This arrangement permits the delivery head to exert draft upon the composite sliver, and for this purpose the relation of the driving gearing of the delivery head with respect to that of the combing chain is such that the belts move faster than the combing chain and therefore draw the sliver relatively through and from the combing-pins, thereby giving it further attenuation. The draft of the delivery head over the combing chain may be adjusted to control the ultimate body of the sliver and in the case of the specific machine illustrated, a convenient draft for the delivery head with respect to the combing chain, may be 2 or 3, more or less, according to the weight or body required for the product sliver, the uniformity of which is assured as above explained by the plurality of laps from which the sliver is combed.

The aggregate draft of the combing and delivering means may be relatively adjusted to the amount of feed or number of laps, to produce a sliver completely combed and sufficiently attenuated by one operation to be immediately spun, or to be spun after drawing, as above explained; but the product sliver may be further combed, if desired, to produce a finer grade of yarn, and for such further treatment the same machine may be employed by appropriately adapting the several feed-boards to receive and conduct continuous lap in an obvious manner.

It will be understood by those skilled in this art that the machine above described is not limited in respect of the size or proportion of its parts or pins nor to the details of their mechanical assemblage or construction, and that various omissions, substitutions, and alterations in the form and operation of the device may be made without departing from the invention. It will also be observed that the machine of this invention may have fiber of different kinds fed into different feed-heads, and will thus operate to mix such fiber in the product in a most thorough manner. In such case, the feeding movement of the feed-heads may be respectively adjusted with relation to the combing-chain so that each will provide a proper draft for its respective kind of fiber.

Claims:

1. A combing machine suitable for operation on raw hemp or like fiber, having means for forming a plurality of laps out of bunches of fiber and operating to feed such plurality of laps, in combination with an organization of moving combing-pins adapted for operation simultaneously on each of said laps and a sliver-delivery head coöperating with said combing-pins to produce a composite sliver from said plurality of laps.

2. A combing machine of the kind described, comprising, in combination, fiber-receiving means adapted for forming a plurality of laps of the fiber, feeding-pins adapted to engage and feed said laps, an organization of combing-pins operating simultaneously on each of said laps and adapted to draw the fibers thereof from their engagement with said feeding-pins, and a sliver-delivery head producing a single sliver from the said plurality of laps.

3. A combing machine of the kind described, comprising an organization of moving combing-pins adapted for simultaneous operation on a plurality of continuous fiber-laps, in combination with feeding means coördinated with said moving combing-pins to feed such laps in floating position on the points of said combing-pins, and a sliver-delivery head producing a single sliver from said plurality of laps.

4. The combination, in a combing machine, of feeding-pins adapted to engage and feed a plurality of fiber-laps, an organization of moving combing-pins operating simultaneously on each of said laps to draw the fibers thereof from their engagement with said feeding-pins and coordinated with said feeding-pins to receive the laps supplied thereby in floating position upon the points of said combing-pins, and means for delivering from said combing-pins a composite sliver of the several laps.

5. A combing machine comprising, in combination, means for receiving raw fiber and forming continuous fiber-laps thereof, feeding-pins adapted to engage and feed said laps, combing-pins adapted to operate simultaneously upon said laps to draw the fibers thereof from engagement with said feeding-pins and coordinated with said feeding-pins to cause the fiber of said laps to float upon the points of the combing-pins, and means for delivering a composite sliver of the several laps from said combing-pins.

6. In a combing machine for hemp or like fiber, means for forming and feeding a plurality of laps of the fiber, in combination with moving combing-pins operative simultaneously upon each of said laps, and means for discharging a single sliver from said combing-pins, the rate of movement of said combing and delivery means being coordinated with the rate of movement and the number of the laps fed, to attenuate the sliver produced from such laps to a condition suited for spinning the same into yarn.

7. In a combing machine, the combination of a moving train of combing pins, several trains of feeding gill-pins operating to feed as many fiber-laps to such moving train of combing-pins and means for varying the angular position of said combing-pins with respect to their path of movement in said moving train.

8. A combing machine comprising fiber-receiving means adapted for forming a plurality of laps from bunches of raw fiber, a moving train of combing-pins geared to operate with high draft on said several laps and a delivery-head comprising belts running in contact and coöperating with said train of combing pins to deliver a composite sliver therefrom.

9. A combing machine of the kind described, comprising an organization of inverted feeding-pins operative upon a plurality of fiber-laps, in combination with a train of upright combing-pins operating simultaneously on each of said laps and means for discharging a single sliver from said combing-pins, the composite of the several laps.

10. In a combing machine, a train of combing-pins adapted for simultaneous operation on a plurality of fiber-laps and means for engaging and feeding such laps to said train, comprising rotary cylinders provided with self-housing gill-pins.

11. In a combing machine, an articulated series of connected gill-bars forming a combing chain and provided with means for controlling the rake of the pins thereof, a plurality of feed-heads coöperating therewith, and each comprising inverted trains of moving gill-pins operative to feed a lap to said chain, and a sliver-delivery head common to the several laps.

12. A combing machine, comprising, in combination, means for feeding a plurality of fiber-laps, combing means therefor common to the said laps and receiving the fibers thereof in superposed and overlapping relation thereon, and means for discharging a composite sliver of said superposed fibers from said combing means.

13. A combing machine, comprising means for forming bunches of raw fiber into a plurality of continuous laps, operative for feeding such laps, a high-draft combing means operative simultaneously on each of said laps and arranged to receive the fibers combed therefrom in superposition, as a composite lap or sliver, and means for discharging said sliver from said combing means.

14. A combing machine comprising a plurality of fiber-feeding means and a combing train coöperating therewith to comb and draw out the fibers therefrom and receive the same in superposed relation upon said train, in combination with a draw-head exerting draft over said combing train and coöperating therewith to discharge a composite sliver therefrom.

15. A combing machine comprising a combing train, means for feeding a plurality of laps to such combing train and in tandem relation with respect to the direction of movement thereof, and a delivery head comprising belts running in contact and exerting draft over said combing train, and functioned to deliver a composite sliver of the several laps therefrom.

16. A combing machine comprising means for feeding a plurality of fiber-laps in tandem relation with respect to the direction of movement of the combing means, combing means common to the several laps and operative simultaneously thereon to draw out fibers therefrom in superposed relation upon said combing means and a delivery head for said combing means, the number and amount of laps fed and the draft of the combing and delivery means with respect to the feed of said fiber-laps being mutually coördinated to produce uniform sliver, sufficiently attenuated to permit the same to be spun into yarn of commercial quality without further combing.

17. A combing machine comprising an organization of moving combing pins and means for driving the same, means for feeding fiber in a distributed relation thereto, and means for delivering the combed sliver therefrom, said feeding and driving means being mutually correlated as to capacity of feed and combing draft to complete the combing in a single passage of the fiber therethrough.

18. A combing machine comprising an organization of moving combing pins and means for driving the same, means for forming bunches of fiber into continuous lap form and feeding the same to said pins in distributed relation thereon, and means for delivering the combed sliver from the pins, said pin-driving means having a combing draft of 100 or over and said feeding means having sufficient capacity in relation to said draft to produce a sliver of a size suitable to spin.

19. A combing machine comprising gill-pin trains arranged to feed a plurality of laps to a common combing train and in tandem relation with respect to the direction of movement thereof, in combination with said combing train operating to draw out individual combed fibers of the several laps from their engagement with their respective feeding train and receiving said fibers as a composite sliver thereon, and means for delivering said composite sliver.

20. In a combing machine, a plurality of feed-heads arranged in tandem relation and each containing a train of feeding-pins, combing-pins functioned for simultaneously drawing fibers from engagement with each of said feeding-trains and suitably coördinated with said trains to receive and engage the fiber fed thereby in floating position on the points of said combing-pins.

21. A combing machine comprising several, tandem arranged, trains of feeding-pins, combing-pins adapted for simultaneously drawing fibers from each of said trains and suitably coördinated therewith to receive and support the fiber fed thereby in floating position upon, and while being disentangled by, said combing-pins, and a delivery head functioned to draw such fibers relatively through said combing-pins and discharge the same as a composite sliver.

22. In a combing machine, the combination of a train of moving combing-pins provided with means for changing their angular position with respect to the path of movement of said train and a plurality of trains of feeding-pins, arranged in tandem relation with respect to said path of movement and operating to feed fiber-laps into engagement with said combing-pin train.

23. In a combing machine, the combination with the combing-pins, of a plurality of feed-heads coördinated therewith to cause the fiber to float on the points of said pins and successively arranged along the path of movement of said pins whereby the combed fibers from one feed-head pass under the floating fibers of the adjacent feed-head.

24. A combing machine comprising a combing-pin train and means disposed above said train to feed the fiber to be combed downwardly at an angle thereto and distributed along the same, and a delivery head operative to discharge sliver from the said combing-pins.

25. In a combing machine, the combination with a combing chain, of a plurality of feed-heads respectively disposed to feed fiber-laps to the operative stretch of said chain and each at a point intermediate of the ends thereof.

26. In a combing machine, a train of combing-pins and means for feeding fiber thereto comprising a series of trains of feeding-pins moving in an angular direction toward and successively disposed along, said train of combing-pins, in combination with means for discharging combed sliver from said combing-pins.

27. In a combing machine, a moving train of combing-pins and means for feeding fiber thereto and in superposed relation thereon comprising sets of one or more tandem arranged feeding cylinders having self-housing gill-pins, and each set forming a lap-feeding train coöperating with said combing train.

28. In a combing machine, the combination of means for feeding a continuous fiber-lap and a combing-pin train operative on said lap, having the rake of its pins and the direction of their movement mutually coördinated to comb the fiber in floating position thereof.

29. In a combing machine, feeding and conducting means for a continuous fiber-lap, combined with a combing-pin train operating adjacent the delivery end of said means and having the rake of its pins and the location of their path of movement mutually coördinated to comb the fiber in preliminary floating position thereon.

30. In a combing machine, a continuous lap-feeding means and a train of forwardly-raked combing-pins coöperating therewith, in combination with means for guiding and driving said train in a path and at a speed adapted to float the fiber on the points of the pins thereof.

31. In a combing machine, the combination of a train of moving combing-pins forming a substantially flat combing table, with means for feeding a continuous lap to said table at a point intermediate of the length thereof.

32. In a combing machine, a combing chain formed of articulated gill-bars, and means for feeding a continuous fiber-lap to an intermediate point of the operating stretch of said chain.

33. In a combing machine, a train of lap-feeding pins and a combing-pin train co-operating therewith and having the rake of its pins and the path of its movement adapted to receive the fiber floating on the points of the pins thereof.

34. In a combing machine, an endless train of combing-pins provided with rake-controlling means adapted to hold said pins in a forwardly inclined position throughout the fiber-receiving stretch of said train and adapted to reverse said inclination at the end of the train, in combination with means for feeding fiber to said train and initially floating the same thereon and means for drawing combed sliver relatively from the end of said combing train.

35. In a combing machine, the combination with means for feeding a continuous fiber-feed constructed and organized to hold fiber bunches while permitting individual fibers to be withdrawn therefrom, of a high-draft combing-pin train having its path and the speed of its movement adapted to receive and comb the fiber from said feeding means in floating position on the combing-pin points and operating to draw out, successively the individual fibers from said feeding means, and means for collecting and discharging said drawn-out fibers.

36. In a combing machine, means for feeding a continuous fiber-feed in a distributed relation with respect to the combing instrument and organized to give preference to the withdrawal of individual fibers over bunches of fibers, in combination with such combing instrument formed of moving combing-pins having their rake and path of movement, relative to said feeding means, mutually coördinated to receive the fiber initially in floating position on the pin-points, and means for collecting and discharging the combed fibers from said combing instrument.

37. In a machine for combing hemp or like fiber, an endless chain of combing-pins, means for feeding a plurality of laps at successive points along one end of a stretch of said chain, in combination with a drawing sliver-delivery head at the other end, the pins on said chain being adapted and caused to incline rearwardly as they approach said delivery-head.

38. In a combing machine, the combination with a combing-pin train, of means adapted to feed fiber bunches to the combing action of said train and operating to feed the forward ends of the said bunches into preliminary partial or intermittent engagement with said combing-pin train.

39. In a combing machine, the combination with a combing-pin train, of means for feeding a fiber-lap to the action of said train comprising means for conducting the butt or squared ends therein into an unsupported position between the continuous body of said lap and the said combing-pin train.

40. In a combing machine, a feed head comprising a train of feeding pins adapted for moving a fiber-lap and means for conducting the forward squared ends therein into a position between the main body of the lap and a combing-pin train, in combination with such combing-pin train operative upon said lap to comb and draw out the fibers from said feeding-pins and adapted to effect preparatory, battering treatment upon said forward ends.

41. In a combing machine, means for forming a fiber-lap and a feed head comprising a feed-apron co-acting with said lap forming means to conduct the lap with the forward ends therein on the underside of said lap, in combination with a combing-pin train operating adjacent the end of said feed-apron and having preliminary battering engagement with the said ends hanging therefrom.

42. In a combing machine, in combination, means for feeding a continuous fiber-lap into preliminary intermittent, and subsequently constant, engagement with a train of moving combing pins, in combination with such train having the rake of its pins and their path of movement suited to maintain the fiber in floating position on the pin-points thereof during the constant engagement of the fiber-lap therewith.

43. In a combing machine, fiber-feeding means, comprising a train of pins adapted for conducting a fiber-lap with the forward ends therein interposed between the main body of said lap and a combing-train, in combination with such train operative to draw out individual fibers from said feeding means and having the rake and path of its pins coördinated to receive and comb said fibers in floating position thereon.

44. In a combing machine, a combing pin train, a feed head comprising a feed board suited for the formation thereon of a continuous fiber-lap, means for inverting said lap and conducting the same inverted to a combing-pin train and in a direction which inclines to the path of movement of said combing-pin train.

45. In a combing machine, a train of combing-pins, in combination with a feed-head comprising a fiber-receiving feed-board, a condensing elbow at the end of said board and a feeding train operative to conduct the lap from said elbow into the action of said train of combing pins.

46. In a combing machine, a feed head comprised of a series of juxtaposed cylinders provided with self-housing gill-pins, and forming an inverted feeding train, and means for supporting the lap in engagement with said inverted train.

47. In a combing machine, a lap-feeding head comprising juxtaposed cylinders with self-housing pins forming an inverted feeding train, in combination with a lap-supporting apron having a curved surface conforming to the contour of the series of cylinders and serving to maintain said lap in contact with the feeding train.

48. The combination in a combing machine of a moving combing table, a lap-supporting apron downwardly and forwardly inclined toward said table, and a train of inverted gill-pins adapted to move the lap along said apron.

49. In a combing machine, lap feeding means comprising a moving train of gill-pins having less rate of movement at the delivery end thereof than at a preceding point in said train.

50. In a combing machine having a combing train, an inclined, fiber-receiving, feed-board adapted for the formation of a fiber-lap, a condensing elbow at the end of said board adapted to condense and invert said lap and a forwardly and downwardly inclined train of gill-pins conducting said inverted lap to a combing train.

51. In a combing machine, an endless train of combing-pins, a plurality of tandem arranged feed-heads therefor provided with inclined and successively overlapping feed-boards.

52. In a combing machine, tandem arranged feed-heads comprising a series of inclined fiber-receiving feed-boards, reversely inclined lap-feeding trains, respectively receiving the fiber from the ends of said boards, and a single means for combing the several laps supplied by said feeding trains.

53. In a combing machine, a chain formed of articulated gill-bars forming a combing table and a driving sprocket-gear engaging opposite stretches of said chain and located intermediate of the ends of said stretches.

54. In a machine of the kind described, an articulated combing chain of sufficient length to accommodate means for feeding fiber at successive points along one end thereof, and having a driving sprocket engaging said chain at an intermediate point of its operative stretch.

55. In a combing machine, an endless combing chain formed of cross bars armed with combing and connected by links at either end, dogs on the ends of the bars, tracks for the bars and dogs to run on, forming upper and lower stretches for said chain, and means for driving said chain comprising a sprocket wheel engaging the said upper and lower stretches intermediate of the ends of such stretches, and means for driving the sprocket wheel.

56. A combing machine having organized therein, a plurality of means for receiving fiber and a single sliver-delivery head, in combination with means for conducting the fiber introduced at each receiving means to the said delivery head, said means comprising a series of sets of gill-pins, each set transmitting its fiber lap directly to a succeeding set in the series and the last set in the series being common to all the said succeeding sets and adapted to conduct the combed fibers thereof to the said sliver delivery.

In witness whereof, I have hereunto set my hand this 20th day of November, A. D., 1909.

JULIA E. GOOD,
Adm'r'x of John Good, dec'd.

Witnesses:
CLIFFORD H. KLOS,
H. G. KIMBALL.